S. E. AVERY.
COMBINED STOVE IMPLEMENT.
APPLICATION FILED DEC. 26, 1911.
1,054,382.
Patented Feb. 25, 1913.
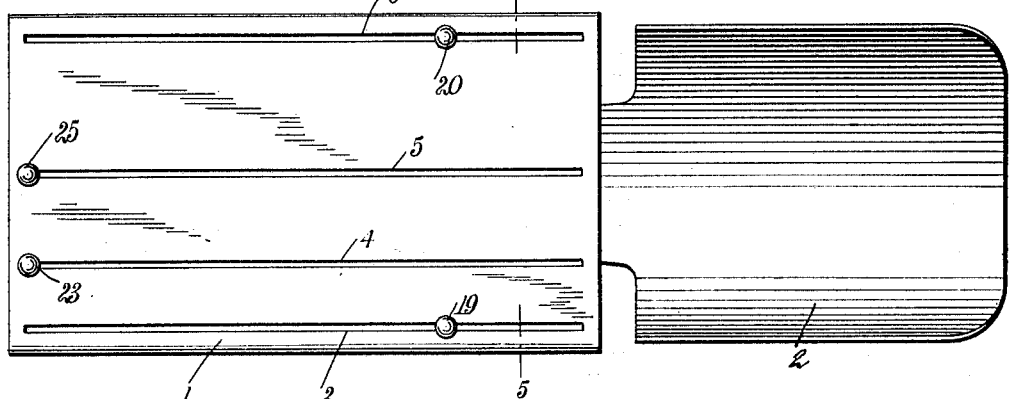
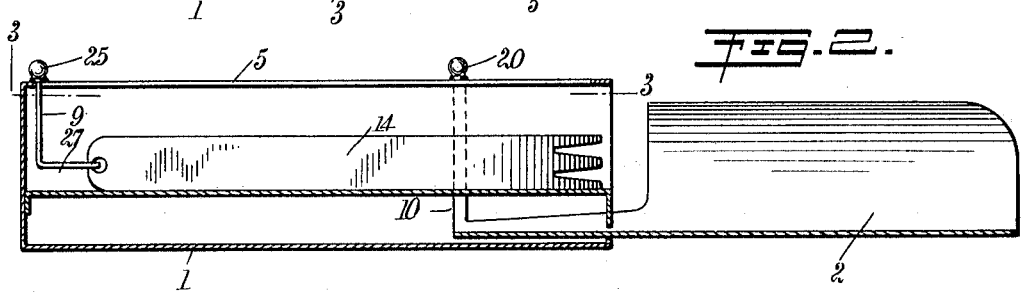
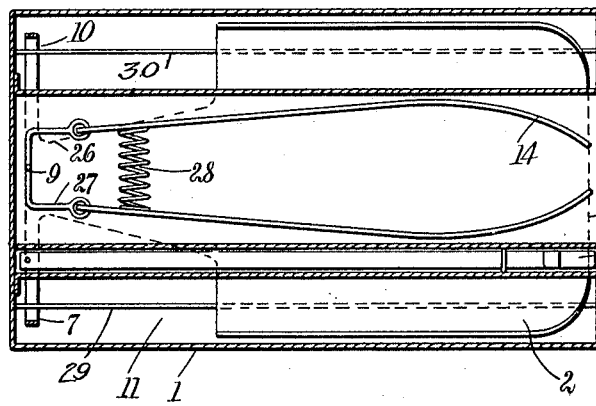
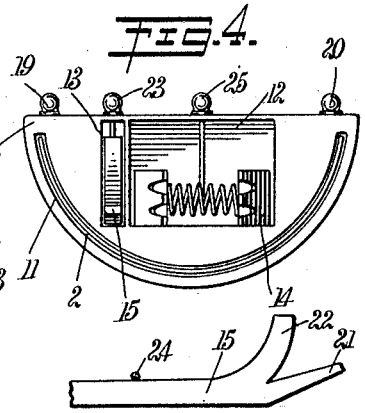
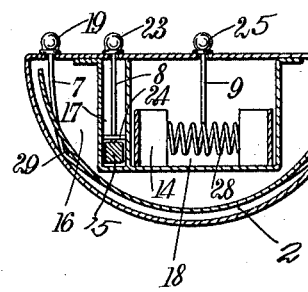
WITNESSES
G. Robert Thomas
A. S. Kitchin
INVENTOR
Sarah Edwards Avery
BY
Munn & Co
ATTORNEYS

UNITED STATES PATENT OFFICE.

SARAH EDWARDS AVERY, OF COLUMBIA, SOUTH CAROLINA.

COMBINED STOVE IMPLEMENT.

1,054,382.  Specification of Letters Patent.  Patented Feb. 25, 1913.

Application filed December 26, 1911. Serial No. 667,808.

*To all whom it may concern:*

Be it known that I, SARAH EDWARDS AVERY, a citizen of the United States, and a resident of Columbia, in the county of Richland and State of South Carolina, have invented a new and Improved Combined Stove Implement, of which the following is a full, clear, and exact description.

The object of the invention is to provide in a single device a combined implement which will act in the capacity of various implements upon the proper manipulation of controlling members, so that the implements may be operated independently, or in any other manner desired.

A further object of the invention is the provision of a slotted holder provided with a shovel, a pair of tongs, and a combined poker and stove lid lifter, and an operating member connected with each of the implements extending through the slots for providing means for easily moving the implements into and out of the holder.

In constructing a combined stove implement according to the present invention, a holder of any suitable shape, size, and material is provided, formed with slots in the top which accommodate operating rods or bars. The operating rods or bars project downward into compartments formed in the holder, each of which contain an implement designed to be projected from the holder and again retracted or withdrawn into the holder.

A practical embodiment of the invention is represented in the accompanying drawings forming a part of this specification, in which similar characters of reference indicate corresponding parts in all the views.

Figure 1 is a top plan view of an embodiment of the invention, showing one of the implements projecting from the holder; Fig. 2 is a longitudinal central vertical section through Fig. 1; Fig. 3 is a section of Fig. 2 on the line 3—3, the shovel being shown retracted; Fig. 4 is a front view of the construction shown in Fig. 1; Fig. 5 is a section through Fig. 1 on the line 5—5; and Fig. 6 is a detail side elevation of a combined poker and stove lid lifter.

Referring to the accompanying drawings by numerals, 1 indicates a holder of any desired size, and also of any desired shape, but preferably formed substantially semi-tubular so as to more easily accommodate a shovel 2. The holder 1 is provided with a plurality of slots 3, 4, 5, and 6, arranged longitudinally in the top for accommodating rods or bars 7, 8, 9, and 10. The front of the holder is provided with a semicircular slot 11 for accommodating the shovel 2, and with openings 12 and 13 for accommodating the tongs 14 and combined poker and stove lid lifter 15. As clearly shown in Fig. 5, the holder or housing 1 is divided into compartments 16, 17, and 18. These compartments are all independent and consequently permit an independent movement of each of the implements in the holder.

The shovel 2 is arranged to be moved into and out of the compartment 16 and is formed with rods 7 and 10, which are provided with knobs 19 and 20. These knobs are formed with bosses or enlargements which act as bearing surfaces on the upper surface of the holder. The combined poker and stove lid lifter 15 is formed with an engaging point 21, and a laterally extending lug 22. The combined poker and stove lid lifter 15 has rigidly connected therewith a rod 8 which has secured to its upper end a knob 23 formed similarly to the knobs 19 and 20. In order to properly hold the combined poker and stove lid lifter 15 in place, a retaining bar 24 is provided which may be anchored in the walls of the chamber 17, or secured in position in any other desired manner. The rod 9 of the tongs 14 is provided with a knob 25, similar to the knob 20, and is designed to act in a similar manner. The rod 9 extends downward and is bifurcated, forming arms 26 and 27 which engage the rear end of the tongs 14 so that upon a proper reciprocatory movement of the knob 25, the tongs will be inserted and removed. In order to cause the tongs to properly open, a spring 28 is provided.

In operation all of the implements are maintained normally within the holder 1, so as to be out of the way and to occupy a minimum space. When it is desired to use the shovel 2, the knobs 19 and 20 are grasped and pushed along the slots 3 and 6. This will cause the shovel 2 to be ejected or forced outward to the position shown in Figs. 1 and 2, whereupon the same may be used as desired. After having been used the shovel is withdrawn into the holder by a reverse movement of the knobs 19 and 20. In order to guide the knobs 19 and 20, and also the rods or bars 7 and 10, longitudinally arranged guiding rods 29 and 30 are provided which engage the rods 7 and 10 intermediate their length and assist in causing the same to perform their proper functions. The tongs 14 may in a similar manner be projected so that the major part thereof will extend beyond the holder. Also it will be evident that the combined poker and stove lid lifter 15 may be projected outward from the holder and again retracted. If it is desired, two or more of the implements may be caused to project or extend outward from the holder at a given time, as for instance, the shovel and tongs may be used simultaneously.

Having thus described my invention, I claim as new and desire to secure by Letters Patent:

In a combined stove implement, a holder formed with a plurality of slots in its upper surface and extending longitudinally thereof and a slot in one end, a shovel formed in cross section of such a shape as to permit the same to be moved back and forth through the slot in the end of the holder, and a pair of arms extending from the inner portion of the shovel through said slots, whereby the shovel may be moved freely back and forth.

In testimony whereof I have signed my name to this specification in the presence of two subscribing witnesses.

SARAH EDWARDS AVERY.

Witnesses:
L. B. ALLEN,
JAMES MACDONALD.

---

Copies of this patent may be obtained for five cents each, by addressing the "Commissioner of Patents, Washington, D. C."